(12) United States Patent
Reinecke et al.

(10) Patent No.: US 10,080,330 B2
(45) Date of Patent: Sep. 25, 2018

(54) VARIABLE AMOUNT OF SIDE SHAKE BASED ON USER INPUTS

(71) Applicant: CNH Industrial America LLC, New Holland, PA (US)

(72) Inventors: Clay A. Reinecke, Blue Grass, IA (US); Kevin S. Schwinn, Orion, IL (US)

(73) Assignee: CNH Industrial America LLC, New Holland, PA (US)

( * ) Notice: Subject to any disclaimer, the term of this patent is extended or adjusted under 35 U.S.C. 154(b) by 71 days.

(21) Appl. No.: 15/241,820

(22) Filed: Aug. 19, 2016

(65) Prior Publication Data
US 2017/0049057 A1 Feb. 23, 2017

Related U.S. Application Data

(60) Provisional application No. 62/207,691, filed on Aug. 20, 2015.

(51) Int. Cl.
| | | |
|---|---|---|
| *A01F 12/32* | (2006.01) | |
| *B07B 1/00* | (2006.01) | |
| *A01F 12/44* | (2006.01) | |
| *A01D 41/127* | (2006.01) | |

(52) U.S. Cl.
CPC ........ *A01F 12/448* (2013.01); *A01D 41/1276* (2013.01)

(58) Field of Classification Search
CPC ..... A01D 75/282; A01F 12/448; A01F 12/32; A01F 12/44; A01F 12/444; A01F 12/446; A01F 12/38; B07B 1/42; B07B 1/28
See application file for complete search history.

(56) References Cited

U.S. PATENT DOCUMENTS

| | | | | | |
|---|---|---|---|---|---|
| 3,744,631 | A | * | 7/1973 | Smith | ........... B07B 1/28 209/319 |
| 4,344,443 | A | * | 8/1982 | De Busscher | ....... A01D 75/282 460/150 |
| 4,355,647 | A | * | 10/1982 | Heidjann | ............. A01D 75/282 460/101 |
| 4,535,788 | A | * | 8/1985 | Rowland-Hill | ...... A01D 75/282 209/416 |

(Continued)

FOREIGN PATENT DOCUMENTS

EP    2 949 199 A1    12/2015

*Primary Examiner* — Arpad Fabian-Kovacs
(74) *Attorney, Agent, or Firm* — Patrick M. Sheldrake

(57) ABSTRACT

An agricultural harvester has a chassis carrying a header removably attached to a feeder housing for gathering a type of crop and feeding it into the agricultural harvester. The feeder housing is connected to a threshing and separating system for separating grain from MOG, which leads to a grain cleaning system for cleaning the separated grain. The grain cleaning system has at least one sieve operable to oscillate fore and aft, and at least one cleaning fan. The grain cleaning system also has a side shaker mechanism operable to produce a side to side shaking motion. A control system is connected to the side shaker mechanism and is operable to automatically adjust the amount of side to side shaking motion on the basis of the type of crop and on the basis of the amount of side slope upon which the agricultural harvester is situated.

23 Claims, 2 Drawing Sheets

(56) References Cited

U.S. PATENT DOCUMENTS

| | | | | |
|---|---|---|---|---|
| 4,548,214 A * | 10/1985 | Sheehan | A01D 75/282 | 460/9 |
| 4,557,276 A * | 12/1985 | Hyman | A01D 75/285 | 209/416 |
| 4,598,718 A * | 7/1986 | Glaubitz | A01D 75/282 | 209/416 |
| 4,897,071 A * | 1/1990 | Desnijder | A01D 75/282 | 460/10 |
| 8,622,792 B1 * | 1/2014 | Murray | A01F 12/448 | 460/101 |
| 8,777,706 B2 * | 7/2014 | Farley | A01D 75/282 | 460/101 |
| 9,232,694 B2 | 1/2016 | Murray et al. | | |
| 2005/0282601 A1 * | 12/2005 | Duquesne | A01D 75/282 | 460/101 |
| 2006/0229119 A1 | 10/2006 | Wamhof et al. | | |
| 2008/0004092 A1 * | 1/2008 | Nelson | A01F 12/448 | 460/101 |
| 2008/0318650 A1 * | 12/2008 | Dhont | A01D 75/282 | 460/101 |
| 2010/0016044 A1 * | 1/2010 | Adamson | A01F 12/448 | 460/101 |
| 2013/0109450 A1 * | 5/2013 | Puvak | A01F 12/32 | 460/101 |
| 2013/0158816 A1 * | 6/2013 | Murray | A01F 12/448 | 701/50 |
| 2014/0171163 A1 * | 6/2014 | Murray | A01F 12/448 | 460/101 |
| 2014/0179381 A1 * | 6/2014 | Murray | A01F 12/448 | 460/101 |
| 2015/0080070 A1 * | 3/2015 | Johnson | A01F 12/448 | 460/5 |
| 2016/0029562 A1 * | 2/2016 | De Smet | A01F 12/32 | 460/1 |
| 2017/0086380 A1 * | 3/2017 | Walter | A01D 41/12 | |
| 2017/0311547 A1 * | 11/2017 | Fuchs | A01D 41/127 | |

* cited by examiner

VARIABLE AMOUNT OF SIDE SHAKE BASED ON USER INPUTS

CROSS REFERENCE TO RELATED APPLICATIONS

This is a non-provisional application based upon U.S. provisional patent application Ser. No. 62/207,691, entitled "VARIABLE AMOUNT OF SIDE SHAKE BASED ON USER INPUTS", filed Aug. 20, 2015, which is incorporated herein by reference.

BACKGROUND OF THE INVENTION

1. Field of the Invention

The present invention relates to agricultural harvesters such as combines, and, more particularly, to sieve assemblies incorporated in the harvester crop processing section having the capability for side to side shaking motion.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger. The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

The upper sieve or sieve assembly is driven in fore and aft movement to move the harvested crop material in an aft direction and at the same time to separate the remaining grain or crop from the non-crop material. When the agricultural harvester is on the side of a slope, side to side movement of the sieve assembly is required so as to prevent downhill pooling of the material and resultant reduction in capacity and/or efficiency. The side to side movement is used generally selectively so that the continuous primary movement is fore and aft. Further, the side to side movement is often adjustable in preset increments, sometimes correlated to the speed of the speed of the cleaning fan. For example, 3 millimeters of side to side movement per degree of lateral side slope or inclination of the sieve assembly may be chosen as a setting for less than 800 fan rpm, as a recommended setting for small seeds. 2.5 millimeters per degree for 800 to 1000 fan rpm may be recommended for medium sized seeds. 2 millimeters per degree for greater than 1000 fan rpm may be recommended for large sized seeds.

However, this simple correlation does not take into account the specific requirements of a given crop type. Moreover, it does not take into account the specific requirements of a given crop type under certain field conditions and/or certain slope conditions. For example, there may be times when the same fan speed could be used for large seeds, such as corn or soybeans, and for medium seeds, such as barley or wheat, whereas the differing sizes of seeds would require more or less side to side movement for the same field conditions and/or slope conditions. Furthermore, by not tailoring the amount of side to side movement to the specific requirements of a given crop type under the existing field conditions and/or slope conditions, often more side to side movement of the sieve assembly is used than may actually be needed under the circumstances, leading to unnecessary wear and tear on mechanical components. Stated another way, some crop types may be more susceptible than others to downhill pooling of the material and reduction in capacity and/or efficiency as a result of side slope, thus requiring more side to side shaking motion of the sieve assembly to maintain capacity and/or efficiency.

Accordingly, what is needed in the art is a system or method that determines the amount of side to side shaking motion of the sieve assembly, and/or the speed of the cleaning fan, according to the specific needs of the crop being harvested, as entered by an operator or determined automatically, under given field conditions with a given amount of side slope.

SUMMARY OF THE INVENTION

The present invention provides such a way to automatically determine the amount of side to side shaking motion of the sieve assembly of a cleaning system of an agricultural harvester based on the specific needs of the crop being harvested under given field conditions with a given amount of side slope. The present invention may further automatically determine the speed of the cleaning fan based on the specific needs of the crop being harvested under given field conditions with a given amount of side slope. The present invention may further use a minimum amount of side to side shaking motion of the sieve assembly necessary to allow the upper sieve and lower sieve of the cleaning system to function properly, in order to minimize wear and tear upon mechanical components.

The present invention may allow an operator to enter the crop type and/or field conditions using a combine monitor connected to a control system, possibly through a prepopulated menu of choices, or through auto crop settings saved in the combine monitor. Alternatively, the amount of side to side shaking motion and/or cleaning fan speed may be determined automatically by the control system according to the type of header that is attached to the combine, for example using a unique pin arrangement within the header electrical connection to identify the header type, and thereby determining the crop type. In another embodiment, the present invention may use another form of identification in order to determine the type of header that is attached to the combine, for example using a communication device such as a Radio Frequency Identification (RFID) chip, to thereby determine the crop type. In another embodiment, the present invention may use position sensing technology, such as global positioning systems (GPS), in order to determine the crop type and/or field conditions. The control system may then utilize automatic crop settings to determine an optimum amount of side to side shaking motion and/or cleaning fan speed for that crop type and/or field condition. The optimum amount of side to side shaking motion may then be adjusted by the control system according to the amount of side slope, specific to the needs of that crop type and/or field condition.

In one form, the invention is directed to an agricultural harvester having a chassis carrying a header for gathering a type of crop. The header is removably attached to a feeder housing for feeding the crop into the agricultural harvester. The feeder housing is connected to a threshing and separating system for separating grain from MOG. The threshing and separating system is connected to a grain cleaning system for further cleaning the separated grain. The grain cleaning system has at least one sieve operable to oscillate fore and aft, and at least one cleaning fan. The grain cleaning system further has a side shaker mechanism operable to produce a side to side shaking motion in the at least one sieve. A control system is connected to the side shaker mechanism and is operable to automatically adjust the amount of side to side shaking motion on the basis of the type of crop and on the basis of the amount of side slope upon which the agricultural harvester is situated.

In another form, the invention is directed to a control system for an agricultural harvester. The agricultural harvester has a chassis carrying a header for gathering a type of crop. The header is removably attached to a feeder housing for feeding the crop into the agricultural harvester. The feeder housing is connected to a threshing and separating system for separating grain from MOG. The threshing and separating system is connected to a grain cleaning system for further cleaning the separated grain. The grain cleaning system has at least one sieve operable to oscillate fore and aft, and at least one cleaning fan. The grain cleaning system further has a side shaker mechanism operable to produce a side to side shaking motion in the at least one sieve. The control system is connected to the side shaker mechanism and is operable to automatically adjust the amount of side to side shaking motion on the basis of the type of crop and on the basis of the amount of side slope upon which the agricultural harvester is situated.

In another form, the invention is directed to a method of controlling an agricultural harvester having a chassis carrying a header for gathering a type of crop. The header is removably attached to a feeder housing for feeding the crop into the agricultural harvester. The feeder housing is connected to a threshing and separating system for separating grain from MOG. The threshing and separating system is connected to a grain cleaning system for further cleaning the separated grain. The grain cleaning system has at least one sieve operable to oscillate fore and aft, and at least one cleaning fan. The grain cleaning system further has a side shaker mechanism operable to produce a side to side shaking motion in the at least one sieve. The method includes several steps. The first step is providing a control system connected to the side shaker mechanism. The second step is automatically adjusting the amount of side to side shaking motion on the basis of the type of crop and on the basis of the amount of side slope upon which the agricultural harvester is situated.

An advantage of the present invention is that it takes into account the specific requirements of a given crop type and/or field conditions in terms of the amount of side to side shaking motion that is required in the sieve assembly in order to prevent downhill pooling of the crop material and reduction in capacity and/or efficiency as a result of side slope. Another advantage of the present invention is that it minimizes the use of side to side shaking motion of the sieve assembly to an effective amount, in order to reduce unnecessary wear and tear on mechanical components.

An advantage of another embodiment of the present invention is that it takes into account the specific requirements of a given crop type and/or field conditions in terms of cleaning fan speed coupled with the amount of side to side shaking motion that is required in the sieve assembly in order to prevent downhill pooling of the crop material and reduction in capacity and/or efficiency as a result of side slope.

Another advantage of the present invention is that it does not rely on the operator to determine the needed settings of side to side shaking motion required in the sieve assembly or the cleaning fan speed as a function of crop type, field conditions, or side slope.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
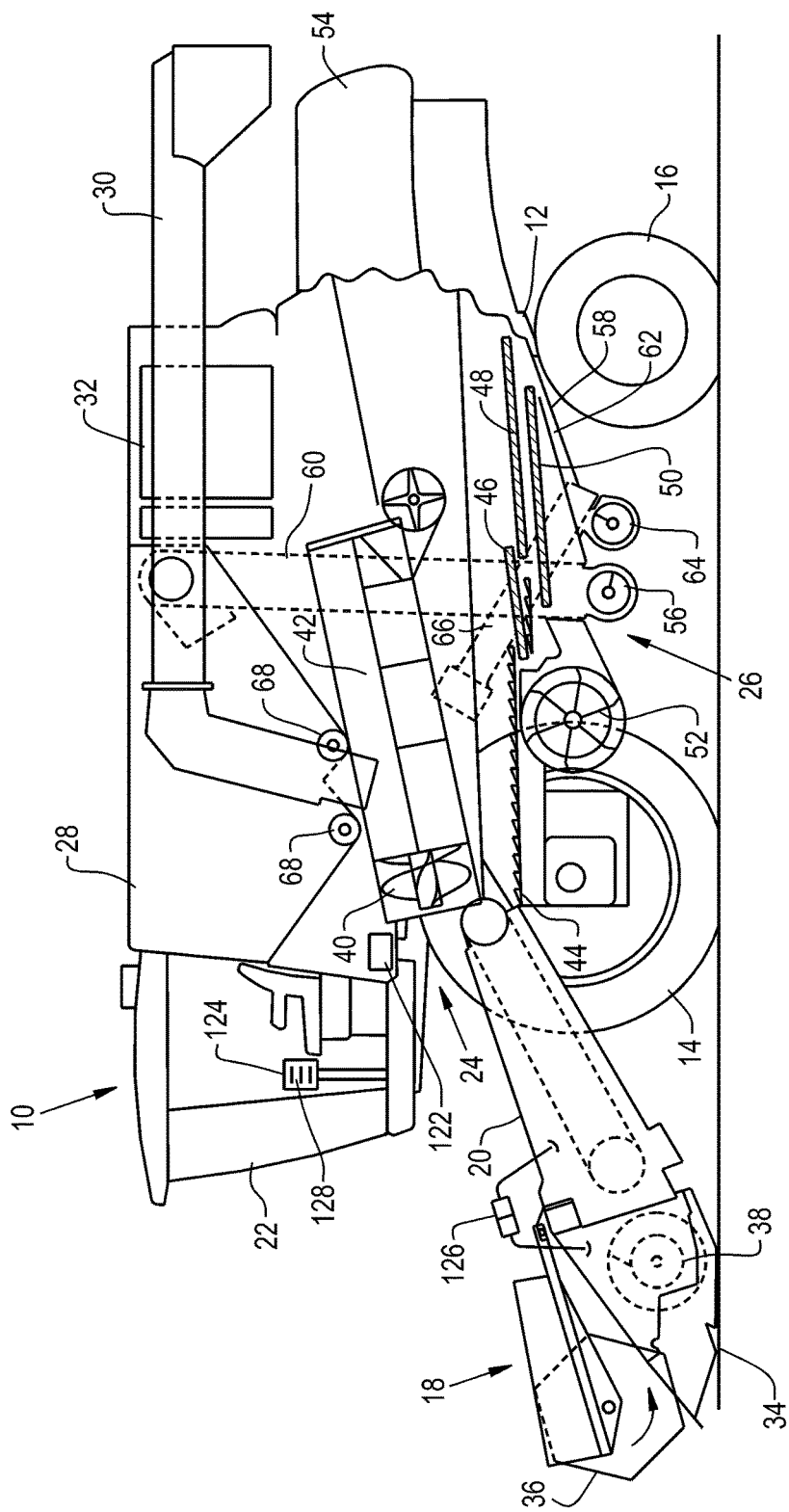
FIG. 1 is a side view of an embodiment of an agricultural harvester in the form of a combine which includes an embodiment of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30. The combine 10 is provided with a control system 122 and a combine monitor 124.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown). The header 18 is connected electrically to the combine 10 by way of a header electrical connection 126, which may have different pin arrangements according to the type of header 18 in use, i.e. —a corn header, a draper header, an auger header, or a pickup header.

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve or sieve assembly), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
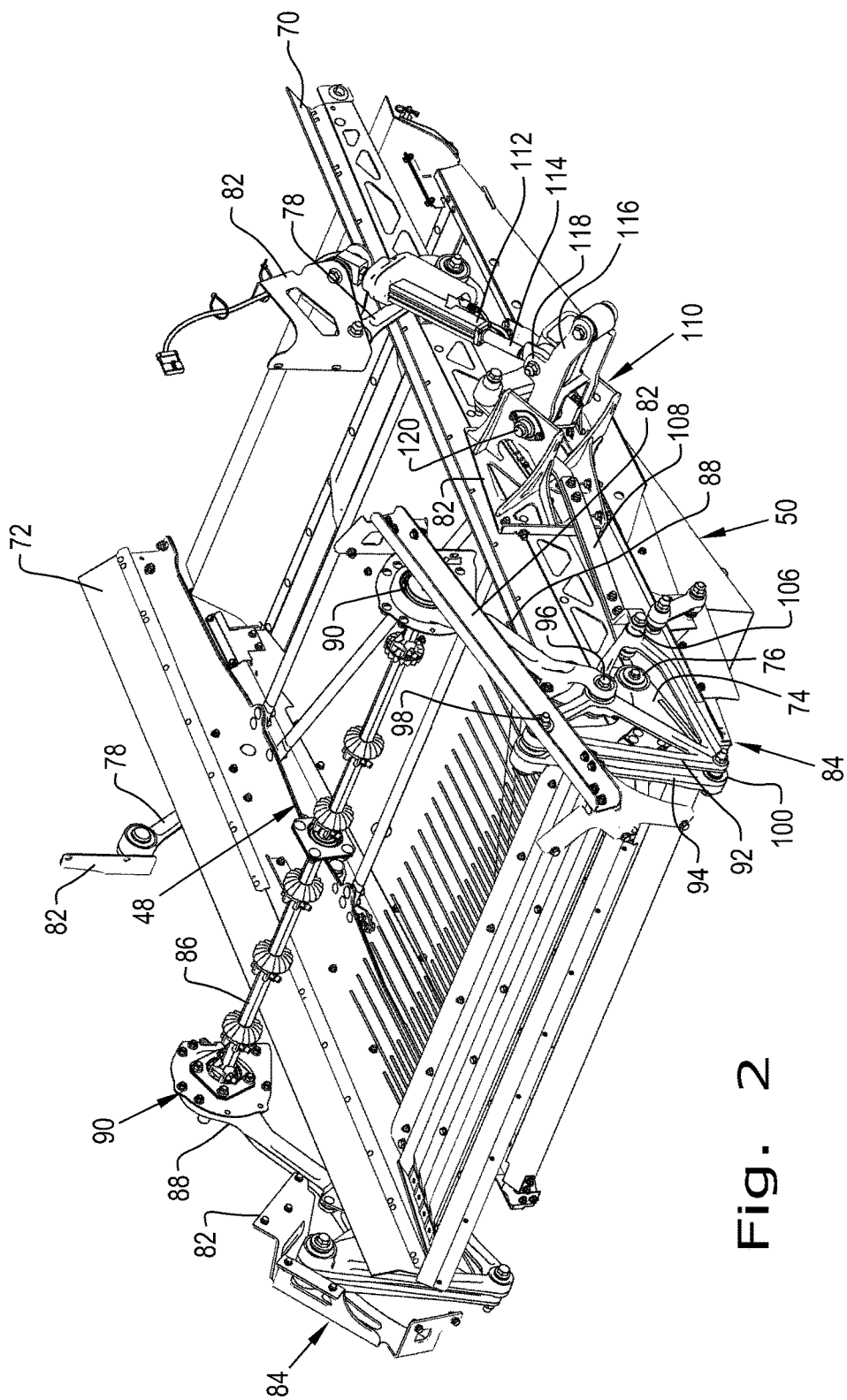
FIG. 2 is a perspective view of a sieve assembly used in an embodiment of the present invention.

Referring now to FIG. 2, the upper and lower sieves or sieve assemblies 48 and 50 are shown. The upper sieve assembly 48 includes a left rail or frame 70 and a right rail or frame 72 interconnected by a cross frame 74. The right and left frames 70 and 72 are supported at the cross frame 74 by a front pivot support 76. A flexible link 78 connects to a rear support to maintain the rear of the rails in place. Support frames 82 provide a base affixed to the chassis 12 to provide ultimate support for the sieve assembly 48. A sieve extends between right and left frames 70 and 72 to provide a surface for carrying material in an aft direction and permit grain or other crop material to drop through and be collected. The sieve is not shown to enable a clearer description of the present invention.

The front of the right and left frames 70 and 72 are mounted for fore and aft movement through a fore and aft oscillation mechanism generally indicated at 84. An input drive shaft 86 extending transverse in chassis 12 receives a suitable power input for rotation. Both ends of drive shaft drive 86 reciprocate arms 88 through eccentric mountings 90. Arm 88 connects to a first frame 92 through a pivotal connection 96. A pivotal mounting 98 supported by frame 82 mounts the first frame 92 and a second frame 94 adjacent to it in radially inward from the first frame 92. A frame interconnection 100 connects the first and second frames 92 and 94. A pivotal connection 106 on first frame 92 connects with a link 108 that drives the lower sieve 50 for reciprocating movement.

The right and left frames 70 and 72 are selectively reciprocated from side to side by a side shaker mechanism generally indicated at 110. The mechanism includes a reciprocating electric actuator 112 appropriately mounted to frame 82 and having an output shaft 114 connecting to a linkage 116 by a pivotal input connection 118. The linkage 116 is pivotally connected to the frame 82 at 120, and serves to translate the reciprocating motion of the reciprocating electric actuator 112 into side to side shaking motion of the upper sieve 48 and lower sieve 50.

The amount of side to side shaking motion of the upper sieve 48 and lower sieve 50 produced by the side shaker mechanism 110 may be varied by the control system 122 of the combine 10. Generally, it is desirable to utilize the minimum amount of side to side shaking motion for a given type of crop on a given degree of side slope on which the combine 10 is situated that will still allow the upper sieve 48 and lower sieve 50 of the cleaning system 26 to function properly, due to increased accelerations and forces in the cleaning system 26, which lead to faster degradation of machine components. Also, by using less side to side shaking motion, the side shaker mechanism 110 will accommodate steeper side slopes due to a finite amount of available space for sideways motion between the sieve assembly 48 and the chassis 12.

Certain crops require different amounts of side to side shaking motion, measured in millimeters of sideways motion per degree (mm/deg) of side slope inclination of the upper sieve 48 and lower sieve 50 of the cleaning system 26, in order for the upper sieve 48 and lower sieve 50 to function properly under various field conditions with a given amount of side slope. Further, certain crops require different amounts of moving air provided by increasing or decreasing the speed of the cleaning fan 52. These requirements for each crop may be optimized through testing the cleaning system 26 with various crops under various field conditions, under various amounts of side slope. The amount of side to side shaking motion and/or the cleaning fan speed may then be set and automatically adjusted based on certain inputs.

The amount of side to side shaking motion and/or cleaning fan speed may, for example, be set according to crop type settings and/or field conditions by allowing an operator to enter the crop type and/or field conditions using the combine monitor 124. For example, these crop type settings and/or field conditions may be selected by the operator from a prepopulated menu of choices 128 on the combine monitor 124, or from auto crop settings saved in the combine monitor. The control system 122 using automatic crop settings then determines an optimum amount of side to side shaking motion and/or cleaning fan speed for that crop type and/or field condition. The optimum amount of side to side shaking motion and/or cleaning fan speed may then be adjusted by the control system 122 according to the amount of side slope on which the combine 10 is currently situated, specific to the needs of that crop type and/or field condition. The amount of side to side shaking motion and/or cleaning fan speed may further be continuously or incrementally adjusted by the control system 122 as the amount of side slope over which the combine 10 passes changes.

Alternatively, the amount of side to side shaking motion and/or cleaning fan speed may be determined automatically by the control system 122 according to the type of header 18 that is attached to the combine 10. The header electrical connection 126 of each type of header 18 may be provided with a unique pin arrangement within the header electrical connection 126, so that the control system 122 to which the header electrical connection 126 is connected can recognize the type of header 18, such as a corn header, a draper header, an auger header, or a pickup header. In this way, the control system 122 can determine the crop type setting, and then determine an optimum amount of side to side shaking motion and/or cleaning fan speed for that crop type under given field conditions. Alternately, each type of header 18 may be provided with a type of communication device such as an RFID chip (not shown), which allows the control system 122 to thereby recognize the type of header 18 that is attached to the combine 10, and thereby determine the crop type setting. Alternatively, the control system 122 may use position sensing technology, such as global positioning systems (GPS), in order to determine the crop type and/or field conditions. Again, the optimum amount of side to side shaking motion and/or cleaning fan speed may then be adjusted by the control system 122 according to the amount of side slope on which the combine 10 is currently situated, specific to the needs of that crop type and/or field condition, and may further be continuously or incrementally adjusted by the control system 122 as the amount of side slope over which the combine 10 passes changes.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
a chassis carrying a header for gathering a type of crop, said header removably attached to a feeder housing for feeding the crop into the agricultural harvester;
a threshing and separating system connected to said feeder housing for separating grain from Material Other than Grain (MOG);
a grain cleaning system connected to said threshing and separating system for further cleaning the separated grain;
said grain cleaning system having at least one sieve operable to oscillate fore and aft, and at least one cleaning fan;
said grain cleaning system further having a side shaker mechanism operable to produce a side to side shaking motion in said at least one sieve; and
a control system connected to said side shaker mechanism and operable to automatically adjust an amount of said side to side shaking motion on the basis of said type of crop and on the basis of an amount of side slope upon which said agricultural harvester is situated such that said side to side shaking motion produced by said side shaker mechanism is correlatively minimized in relation to said type of crop and said amount of side slope.

2. The agricultural harvester of claim 1, wherein:
said type of crop being determined by said control system on the basis of crop type information entered by an operator using a combine monitor connected to said control system.

3. The agricultural harvester of claim 2, wherein:
said crop type information being entered by said operator using one of a prepopulated menu of choices on said combine monitor and auto crop settings saved in the combine monitor.

4. The agricultural harvester of claim 1, wherein:
said type of crop being determined by said control system on the basis of a type of said header connected to said feeder housing.

5. The agricultural harvester of claim 4, wherein:
said control system determining said type of said header connected to said feeder housing using one of a header electrical connection pin arrangement and a communication device.

6. The agricultural harvester of claim 1, wherein:
said control system determining said type of crop according to position sensing technology.

7. The agricultural harvester of claim 1, wherein:
said control system connected to said side shaker mechanism is further operable to automatically adjust said amount of said side to side shaking motion on the basis of a current field condition entered by an operator using a combine monitor connected to said control system.

8. The agricultural harvester of claim 1, wherein:
said control system is further operable to automatically adjust the speed of said at least one cleaning fan on the basis of said type of crop and said amount of side slope.

9. The agricultural harvester of claim 1, wherein:
said control system is further operable to adjust said amount of said side to side shaking motion to a minimum effective amount for said type of crop and said amount of side slope.

10. A control system for an agricultural harvester having a chassis carrying a header for gathering a type of crop, the header removably attached to a feeder housing for feeding the crop into the agricultural harvester, a threshing and separating system connected to the feeder housing for separating grain from MOG, a grain cleaning system connected to the threshing and separating system for further cleaning the separated grain, the grain cleaning system having at least one sieve operable to oscillate fore and aft, and at least one cleaning fan, the grain cleaning system further having a side shaker mechanism operable to produce a side to side shaking motion in the at least one sieve, wherein:
said control system is connected to the side shaker mechanism and operable to automatically adjust an amount of said side to side shaking motion on the basis of the type of crop and on the basis of an amount of side slope upon which the agricultural harvester is situated such that said side to side shaking motion produced by said side shaker mechanism is correlatively minimized in relation to said type of crop and said amount of side slope.

11. The control system of claim 10, wherein:
said type of crop being determined by said control system on the basis of crop type information entered by an operator using a combine monitor connected to said control system.

12. The control system of claim 11, wherein:
said crop type information being entered by said operator using one of a prepopulated menu of choices on said combine monitor and auto crop settings saved in the combine monitor.

13. The control system of claim 10, wherein:
said type of crop being determined by said control system on the basis of the type of header connected to the feeder housing.

14. The control system of claim 13, wherein:
said control system determining the type of header connected to the feeder housing according to one of a header electrical connection pin arrangement and a communication device.

15. The control system of claim 10, wherein:
said control system determining said type of crop according to position sensing technology.

16. The control system of claim 10, wherein:
said control system connected to said side shaker mechanism is further operable to automatically adjust said amount of said side to side shaking motion on the basis of a current field condition entered by an operator using a combine monitor connected to said control system.

17. The control system of claim 10, wherein:
said control system is further operable to automatically adjust the speed of the at least one cleaning fan on the basis of said type of crop and said amount of side slope.

18. The control system of claim 10, wherein:
said control system is further operable to adjust said amount of said side to side shaking motion to a minimum effective amount for said type of crop and said amount of side slope.

19. A method, including the steps of:
providing an agricultural harvester having a chassis carrying a header for gathering a type of crop, the header removably attached to a feeder housing for feeding the crop into the agricultural harvester, a threshing and separating system connected to the feeder housing for separating grain from MOG, a grain cleaning system connected to the threshing and separating system for further cleaning the separated grain, the grain cleaning system having at least one sieve being operable to oscillate fore and aft, and at least one cleaning fan, the grain cleaning system further having a side shaker mechanism operable to produce a side to side shaking motion in the at least one sieve, the agricultural vehicle further including a control system connected to the side shaker mechanism; and
automatically adjusting an amount of said side to side shaking motion on the basis of the type of crop and on the basis of an amount of side slope upon which the agricultural harvester is situated such that said side to side shaking motion produced by said side shaker mechanism is correlatively minimized in relation to said type of crop and said amount of side slope.

20. The method of claim 19, further comprising the steps of:
determining said type of crop on the basis of crop type information entered by an operator using a combine monitor connected to said control system, said crop type information being entered by said operator using one of a prepopulated menu of choices on said combine monitor and auto crop settings saved in the combine monitor.

21. The method of claim 19, further comprising the steps of:
determining said type of crop on the basis of the type of header connected to the feeder housing according to one of a header electrical connection pin arrangement and a communication device.

22. The method of claim 19, further comprising the steps of:
said control system determining said type of crop according to position sensing technology.

23. The method of claim 19, further comprising the steps of:
automatically adjusting said amount of said side to side shaking motion on the basis of a current field condition entered by an operator using a combine monitor connected to said control system.

* * * * *